(12) United States Patent
Batra et al.

(10) Patent No.: US 8,001,207 B2
(45) Date of Patent: Aug. 16, 2011

(54) COMMON LOCATION-BASED SERVICE ADAPTER INTERFACE FOR LOCATION BASED SERVICES

(75) Inventors: Virinder M. Batra, Chapel Hill, NC (US); Valerie M. Bennett, Macon, NC (US); Andrew N. Capella, Cary, NC (US); Xiaoyan Chen, Beijing (CN); Xiao Cheng Ding, Beijing (CN); Peter R. Gamble, Raleigh, NC (US); Steven M. Miller, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1996 days.

(21) Appl. No.: 10/077,012

(22) Filed: Feb. 15, 2002

(65) Prior Publication Data

US 2003/0172125 A1 Sep. 11, 2003

(51) Int. Cl.
*G06F 15/16* (2006.01)
*G06F 7/00* (2006.01)
*G06F 17/30* (2006.01)
(52) U.S. Cl. ........................................ 709/217; 707/724
(58) Field of Classification Search .................. None
See application file for complete search history.

(56) References Cited

U.S. PATENT DOCUMENTS

| 6,073,201 | A | 6/2000 | Jolley et al. | 710/129 |
| 6,144,990 | A | 11/2000 | Brandt et al. | 709/203 |
| 6,199,068 | B1 | 3/2001 | Carpenter | 707/100 |
| 2002/0035605 | A1* | 3/2002 | McDowell et al. | 709/206 |
| 2002/0126701 | A1* | 9/2002 | Requena | 370/469 |

FOREIGN PATENT DOCUMENTS

WO WO 00/04730 1/2000

OTHER PUBLICATIONS

Zhang, Jianting & Gruenwald Le, "A GML-Based Open Architecture for Building a Geographical Information Search Engine Over the Internet," Dec. 2001, IEEE, vol. 2, pp. 25-32.*
R. Jose et al. "An Open Architecture for Developing Mobile Location-Based Applications Over the Internet," Jul. 2001, IEEE, pp. 500-505.*
Lee, Kang-Jun et al, "Development of an XML Data Provider Supporting the OpenGIS Specification," Jul. 2004, IEEE, pp. 1936-1938.*
Local.info™, Personalize M-Commerce Services With Location, SignalSoft, Corp.

* cited by examiner

*Primary Examiner* — Krista M Zele
*Assistant Examiner* — Azizul Choudhury
(74) *Attorney, Agent, or Firm* — Steven M. Greenberg, Esq.; Carey, Rodriguez, Greenberg & Paul

(57) ABSTRACT

The present invention is a common location-based service adapter interface. The common location-based service adapter interface can include a uniform input interface through which location-based services can be requested using a uniform format which is independent of any specific formatting required by a particular service adapter configured to process the location-based services. The common location-based service adapter interface also can include a uniform output interface through which specifically formatted result sets can be formatted using the uniform format.

1 Claim, 2 Drawing Sheets

COMMON LOCATION-BASED SERVICE ADAPTER INTERFACE FOR LOCATION BASED SERVICES

BACKGROUND OF THE INVENTION

1. Statement of the Technical Field

The present invention relates to the field of pervasive computing and more particularly to an interface for location-based service adapters.

2. Description of the Related Art

Personal computers no longer are the most common vehicle through which users connect to data communications networks like the Internet. Now that computing can be viewed as being truly everywhere, computer scientists and information technologists have begun to rethink those services that can be provided to meet the needs of mobile computing users. In consequence, the study of pervasive computing has resulted in substantial innovation in the field of network connectivity. "Pervasive computing" has been defined as referring to any non-constrained computing device not physically tethered to a data communications network. Thus, pervasive computing devices refer not only to computers wirelessly linked to networks, but also to handheld computing devices, wearable systems, embedded computing systems and the like.

In the case of pervasive computing devices, mobile users often prefer that the data reflect the location of the pervasive computing device. Notably, while in conventional telephony, it would be unusual to investigate the location of the computing device as phone numbers are linked to a static, geographic location place, in mobile computing, the phone number associated with a pervasive device bears no relation to the physical location of the pervasive device.

Location-based services allow mobile users of pervasive devices and those who communicate with mobile users of pervasive devices to have some knowledge of the geographic proximity of the mobile users. From the perspective of the mobile user, weather forecasts can be requested and provided based upon the location of the mobile user. Likewise, local services such as restrooms or restaurants which are proximate to the pervasive device can be identified based upon the location of the pervasive device. Advantageously, using location-based services it is unnecessary for mobile users first to manually specify ZIP codes or other location identifiers. Rather, the location of the pervasive device can be determined from the pervasive device, itself.

Location-based services typically are deployed in a wireless network in which wireless clients can include cellular telephones, personal digital assistants, paging devices, on-board embedded computing devices and the like. Location finding equipment also can be included within the wireless network and can include satellite based locators, radio-frequency locators and other location detection devices. Network requests from the wireless clients can be forwarded to application servers as can the location data provided by the location finding equipment. The location data can be specified using the well-known Geography Markup Language (GML) and can be selectably forwarded to location-based applications, for instance within the headers of the network requests. Notably, not only can absolute positioning data be provided, but intentionally less certain data can be provided based upon "uncertainty attributes" well-known in the art.

Based upon the location data, the location-based application can provide any number of location-based services, including providing a textual, audible or visual representation of the mobile user's location, or services proximately available to the mobile user. When combined with mobile user preference and profile information, location-based services can drive mobile commerce—the revenue engine of the wireless market. Thus, a bevy of location-based services have been deployed to the Internet, each service having implemented one or more location-based applications.

Given the proliferation of location-based services, application servers now can access multiple, disparate location-based services through differing location service interfaces. In consequence, integration and aggregation have become significant challenges to the implementation of a composite location-based service. Specifically, each location-based service vendor can provide a different, application programming interface (API) to their respective location-based application.

While some vendors support the well-known extensible markup language (XML) both in their API and in the output provided by the location-based application, other vendors support only a proprietary format for both application input and output. Accordingly, applications deployed for use in a network of pervasive devices which support location-based services must include a design specifically tailored to the API of each supported back-end location-based application, requiring substantially more programming expertise than may be feasible. Accordingly, such applications can bear the burden of increased complexity of design and maintenance.

SUMMARY OF THE INVENTION

The present invention is a common location-based service adapter interface. The common location-based service adapter interface can include a uniform input interface through which location-based services can be requested using a uniform format which is independent of any specific formatting required by a particular service adapter configured to process the location-based services. The common location-based service adapter interface also can include a uniform output interface through which specifically formatted result sets can be formatted using the uniform format.

Notably, the uniform input interface can include one or more location-based service adapter objects, each adapter object being configured to provide the location-based service responsive to receiving a uniformly formatted location-based service request. Also, the common location-based service adapter interface can include a location service object configured to provide a reference to a particular one of the location-based service adapter objects based upon a specified location-based service. Finally, the common location-based service adapter interface can include one or more location request objects configured to define location-based service request parameters required by generic ones of the location-based service adapter objects.

A method of the location service processing requests from client applications for location-based services provided by one or more disparate location-based service providers can include receiving requests for location based-services. A particular location-based service provider which can service the request can be determined from each request. Subsequently, each request can be specifically formatted according to a specific format specified by the particular location-based service provider. Likewise, each result set can be uniformly formatted. Finally, the uniformly formatted result sets can be forwarded to the location based service providers. Notably, in one aspect of the invention, the uniformly formatted result sets can include result sets which have been formatted according to the Geography Markup Language (GML).

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a common location-based service adapter interface. The common location-based service adapter interface is a layered interface configured to shield request for location-based services from the details of vender specific location-based service adapters. In particular, responsive to receiving a request for location-based services, the common location-based service adapter interface of the present invention can specifically format and issue a corresponding location-based service request to a specified underlying vender specific location-based service adapter. Upon receipt of a specifically formatted result set from the underlying vender specific location-based service adapter, the common location-based service adapter interface can uniformly format the result set and issue the result set to the location-based service application.

Figure 1:
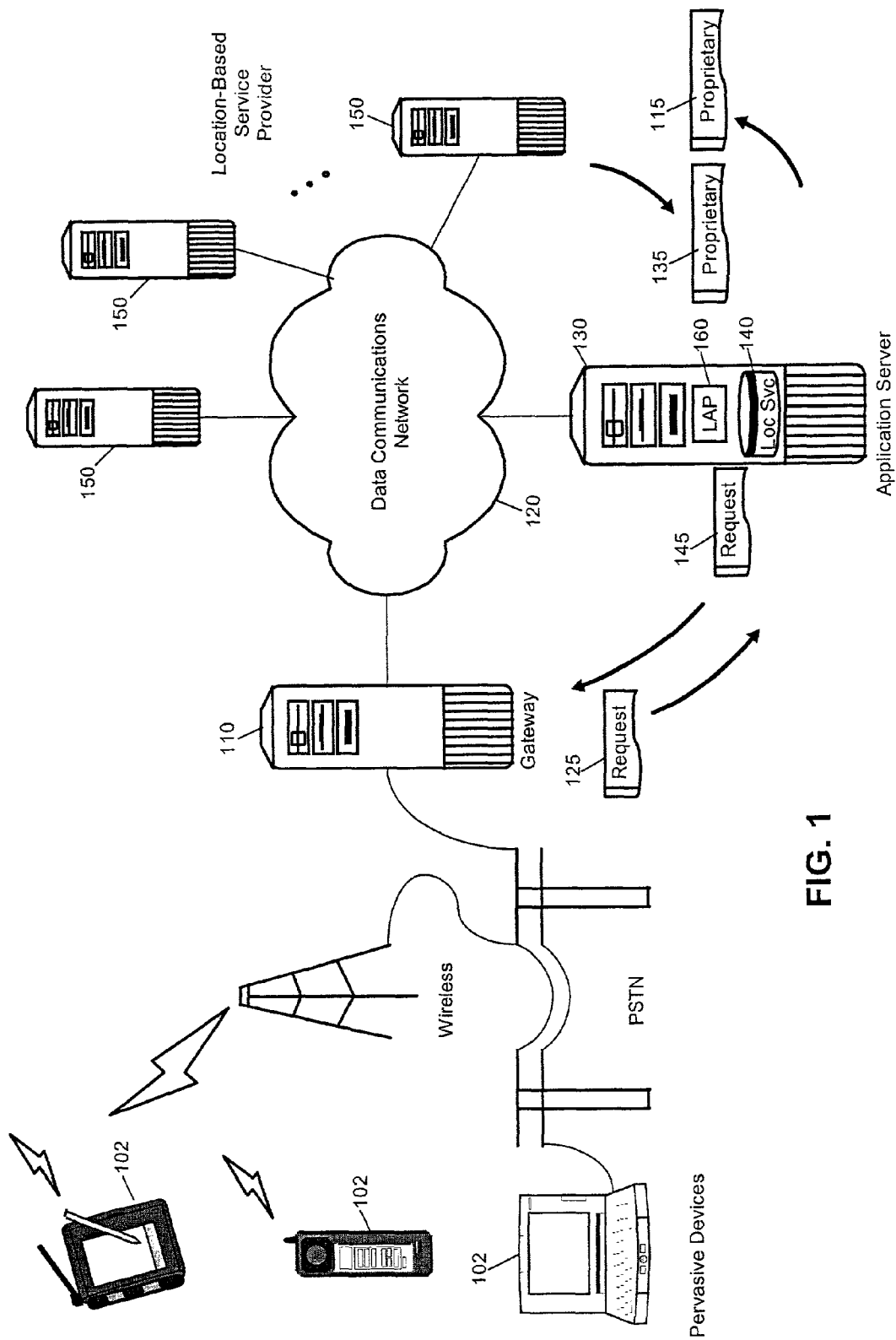
FIG. 1 is a schematic illustration of a pervasive computing system configured with the common location-based service adapter interface of the present invention; and, FIG. 2 is a UML diagram illustrating an object-oriented implementation of the common location-based service adapter interface of FIG. 1.

FIG. 1 is a schematic illustration of an integrated network of wireless and wireline pervasive computing devices 102, each communicatively linked to an application server 130 through which location-based services can be provided. In particular, the pervasive computing devices can transmit network requests 125 for location-based services to the location-based service application 160 via a communications gateway 110. The network requests 125 can be conventional hypertext transfer protocol (HTTP) requests, although the invention is not limited in regard to the particular mode of network communication.

Upon receipt of the network request 125, the location service 140 can parse the header of the network request 125 and build a uniformly formatted request for location-based services. In particular, different location-based service applications 160 can provide different location-based services, albeit each through a different adapter interface.

Once the location service 140 has identified a particular location-based service provider 150 which is suitable for providing the requested location-based service, the location service 140 can format a location request in accordance with the adapter interface specified for the particular location-based service provider 150. For instance, the location service 140 can build a uniformly formatted request as an extensible markup language (XML)-formatted data in a specifically formatted request for location-based services. As an example, Appendix A contains a markup listing of an exemplary "WHEREAMI?" request which has been formatted using XML in accordance with the adapter interface of one particular location-based service provider 150.

Once built, the specifically formatted request 135 can be forwarded to the particular location-based service provider 150. When receiving a specifically formatted request 135, each location-based service provider 150 can service the specifically formatted request 135 as would be the case in a conventional arrangement, each location-based service provider 150 returning a specifically formatted result set 115 which has been formatted according to the adapter interface of the particular location-based service provider 150. As an example, Appendix A illustrates a location-based service provider type request 'WHEREAMI?' which has been formatted using XML in accordance with the adapter interface of one particular location-based service application. Appendix B illustrates the exemplary result set for that location-based service provider type request 'WHEREAMI?'.

The location service 140, upon receiving specifically formatted result sets 115 from respective location based service provider 150, can translate the specific format of the result set into the uniform format, for instance a GML-specified format. As an example, Appendix C illustrates a GML formatted translation of the XML formatted result set of Appendix B. Finally, the uniformly formatted result set 145 can be sent to the location-based service application 160. The location-based service application 160 can process the location-based service request and the results can be returned to the client.

Figure 2:
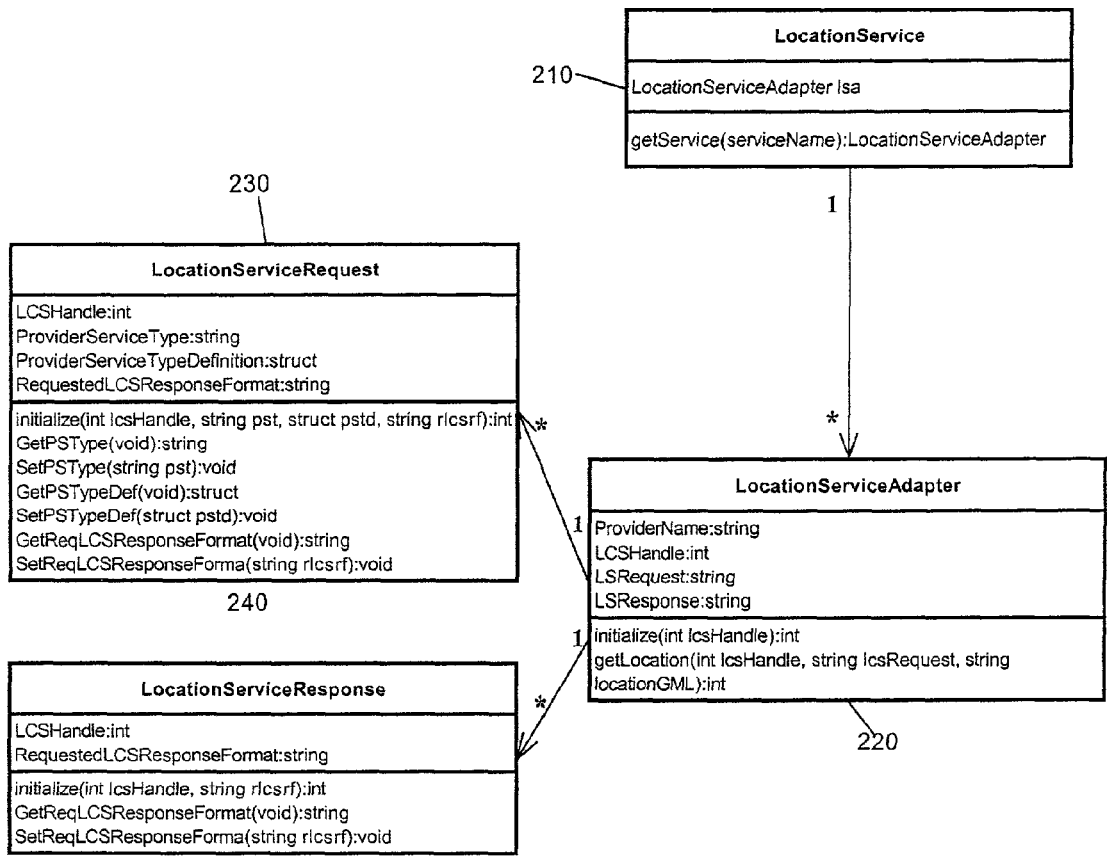

The location service 140 of FIG. 1 can include an object oriented implementation suitable for deployment in conventional middleware servers such as the Websphere® EveryPlace Suite® manufactured by International Business Machines Corporation of Armonk, N.Y. FIG. 2 is a UML diagram of an object oriented implementation of the location service 140 of FIG. 1. As will be apparent to one skilled in the art, the location service 140 can include one or more LocationService objects 210. Each LocationService object 210 can have an association with one or more LocationServiceAdapter objects 220. Finally, each LocationServiceAdapter objects 220 can handle one or more LocationServiceRequest objects 230 and one or more LocationServiceResponse objects 240.

LocationService objects 210 represent location-based services which can be provided by associated LocationServiceAdapter objects 220. By comparison, LocationServiceAdapter objects 220 are adapters which handle specific location-based services requests and responses to and from vendor-specific location-based services. In operation, the getService(serviceName) method of the LocationService objects 210 can be used to return a reference to the LocationServiceAdapter objects 220 associated with the location-based service specified by the serviceName string. The LocationServiceAdapter objects 220, in turn, can process a request for location-based services stored in an associated LocationServiceRequest objects 230.

Notably, the LocationServiceRequest objects 230 can define the request parameters required by a generic location-based service adapter interface. For example, the LocationServiceRequest objects 230 can include both a ProviderService Type data member for specifying the type of location-based service requested of a particular location-based service provider, and also a ProviderService TypeDefinition structure which can include the details for the type of service requested. For example, the "WHEREAMI" service can require a MIN parameter.

The LocationServiceAdapter objects 220 further can process the results of requests for location-based services within LocationServiceResponse objects 240. In particular, the LocationServiceResponse objects 240 can encapsulate those results formatted using a set response format, for instance a GML-formatted string. Notably, for both the LocationServiceRequest objects 230 and the LocationServiceResponse objects 240, getter and setter methods can be defined for basic parameters including as provider service type, provider service type definition and a requested location services response format.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A common location-based service adapter interface, comprising: a uniform input interface through which location-based services can be requested using a uniform format which is independent of any specific formatting required by a particular service adapter configured to process said location-based services; and, a uniform output interface through which specifically formatted result sets can be formatted using said uniform format, wherein said uniform input interface adapted to be connected to different service adapters specifying different formats for receiving inputs; wherein said uniform input interface comprises: a plurality of location-based service adapter objects, each said adapter object being configured to provide said at least one location-based service responsive to receiving a uniformly formatted location-based service request; a location service object configured to provide a reference to a particular one of said location-based service adapter objects based upon a specified location-based service; and, a plurality of location request objects configured to define location-based service request parameters required by generic ones of said location-based service adapter objects.

* * * * *